(12) United States Patent
Numaguchi et al.

(10) Patent No.: US 9,083,211 B2
(45) Date of Patent: Jul. 14, 2015

(54) AXIAL GAP TYPE GENERATOR

(71) Applicant: Fuji Jukogyo Kabushiki Kaisha, Tokyo (JP)

(72) Inventors: Kazuya Numaguchi, Tokyo (JP); Hiroyuki Hisada, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 249 days.

(21) Appl. No.: 13/742,023

(22) Filed: Jan. 15, 2013

(65) Prior Publication Data

US 2014/0132006 A1    May 15, 2014

(30) Foreign Application Priority Data

Jan. 19, 2012    (JP) ................................ 2012-009040

(51) Int. Cl.
  *H02K 7/18*    (2006.01)
  *H02K 21/24*    (2006.01)
  *H02K 5/04*    (2006.01)
  *F02B 63/04*    (2006.01)

(52) U.S. Cl.
  CPC ............ *H02K 7/1815* (2013.01); *F02B 63/042* (2013.01); *H02K 5/04* (2013.01); *H02K 21/24* (2013.01)

(58) Field of Classification Search
  CPC ...... F02B 63/04; F02B 63/042; F02B 63/044; F02B 63/048; H02K 7/006; H02K 7/1815; H02K 16/04; H02K 21/24; H02K 5/04; H02K 5/06

USPC ............... 310/156.35; 180/53.5, 65.31; 123/3
  See application file for complete search history.

(56) References Cited

U.S. PATENT DOCUMENTS

| 2001/0042532 | A1* | 11/2001 | Aichinger et al. ......... 123/192.1 |
| 2007/0200439 | A1* | 8/2007 | Nagahashi et al. ............. 310/54 |
| 2007/0227470 | A1* | 10/2007 | Cole et al. .......................... 123/3 |
| 2009/0230694 | A1 | 9/2009 | Yoshida et al. |

FOREIGN PATENT DOCUMENTS

| JP | 10-004650 A | 1/1998 |
| JP | 2002-309957 (A) | 10/2002 |
| JP | 2009-216014 A | 9/2009 |
| JP | 2010-038006 A | 2/2010 |

OTHER PUBLICATIONS

Kamiyoshi, JP10004650 Machine Translation, Jan. 1998.*
Notification of Reason(s) for Refusal dated Dec. 3, 2013.

* cited by examiner

*Primary Examiner* — Quyen Leung
*Assistant Examiner* — Eric Johnson
(74) *Attorney, Agent, or Firm* — McGinn IP Law Group, PLLC

(57) ABSTRACT

There is provided an axial gap type generator. The an axial gap type generator includes: generator cases are fixed to a crank case of an engine; a rotor yoke housed inside the generator cases and fixed to a crankshaft of the engine; a first stator core and a second stator core fixed to inner faces of the generator cases and disposed flanking the rotor yoke in a rotation axis direction; generator case supports for supporting the generator case in such a manner that a surface section of the generator case opposing the crank case has a spacing between the surface section and the crank case.

14 Claims, 3 Drawing Sheets

AXIAL GAP TYPE GENERATOR

CROSS-REFERENCE TO RELATED APPLICATIONS

The present application claims priority from Japanese Patent Application No. 2012-009040 filed on Jan. 19, 2012, the entire contents of which are hereby incorporated by reference.

BACKGROUND OF THE INVENTION

1. Field of the Invention

The present invention relates to an axial gap type generator that is mounted on an engine, and more particularly, to an axial gap type generator in which transfer of heat from the engine to a generator case is suppressed.

2. Description of the Related Art

For general-purpose engines or the like for industrial use, there is known a configuration in which a generator is connected with one end of a crankshaft protruding out of an engine main body.

For instance, a technique disclosed in Japanese Unexamined Patent Application Publication (JP-A) No. H10-4650 provides magnets for power generation at a flywheel that is fixed to the crankshaft end of a motorcycle engine, and coils for power generation, the coils being fixed to the engine, at sites that oppose the magnets in the radial direction.

Furthermore, in recent years, the use of an axial gap type generator has been proposed for compact generator configurations. In the axial gap type generator, stator cores that are fixed to the engine and are provided with power generation coils, and rotor yokes that are provided with magnets for power generation and rotate together with a crankshaft are disposed opposing one another in the center axis direction of the crankshaft.

For instance, in an axial gap type generator disclosed in JP-A No. 2009-216014, a stator core fixed to an engine is disposed in spacing between a pair of rotor yokes that protrude from a crankshaft towards the outer diameter side and are spaced apart from each other in the axial direction.

Also, in an axial gap type generator disclosed JP-A No. 2010-038006, protrusions that are integrally formed with a stator are directly connected with a support member on the side of an engine, thereby enhancing the positioning precision of a stator core with respect to the engine.

When internal temperature rises, the power generation efficiency of axial gap type generators such as those described above drops on account of impaired performance of magnetic bodies, and it is therefore necessary to suppress transfer of heat, generated in the engine, towards the generator.

SUMMARY OF THE INVENTION

In the light of the above, it is an object of the present invention to provide an axial gap type generator in which transfer of heat from an engine to a generator case is suppressed.

A first aspect of the present invention provides an axial gap type generator that includes: a generator case fixed to a crank case of an engine; a rotor yoke housed inside the generator case, and fixed to a crankshaft of the engine; and a first stator core and a second stator core fixed to an inner face of the generator case, and disposed flanking the rotor yoke in a rotation axis direction; a generator case support that supports the generator case in such a manner that a surface section of the generator case has a spacing between the surface section and the crank case, the surface section opposing the crank case.

By providing a spacing between the generator case and the crank case it becomes possible to suppress transfer of heat between the foregoing, and to prevent drops in power generation efficiency caused by rising temperature in the interior of the generator.

Preferably, the generator case support is disposed further toward an outer diameter side than an outer peripheral edge of the stator cores.

As a result, transfer of heat towards the stator cores can be suppressed by lengthening the heat transfer path from the support to the stator cores.

Preferably, the generator case support is disposed at a position apart from an oil reservoir in the crank case, with the crank case viewed in the axial direction of the crankshaft.

This suppresses transfer of heat, generated by high-temperature oil, towards the generator, across the wall face of the crank case.

Preferably, the generator case support has at least one protrusion protruding from either one of the generator case and the crank case towards the other.

As a result, the above-mentioned effects can be achieved without increasing the number of parts.

DESCRIPTION OF THE PREFERRED EMBODIMENTS

The present invention provides an axial gap type generator in which transfer of heat from an engine to a generator case is suppressed, by mounting a generator on a crank case, by way of protrusions that are formed on a front case, and by providing a spacing between the crank case and the front case.

[Embodiment]

Hereinafter, an embodiment of the axial gap type generator according to the present invention will be described.

The axial gap type generator of the embodiment is driven mounted on, for instance, one of the ends of a crankshaft of a general-purpose engine for industrial use.

Figure 1:
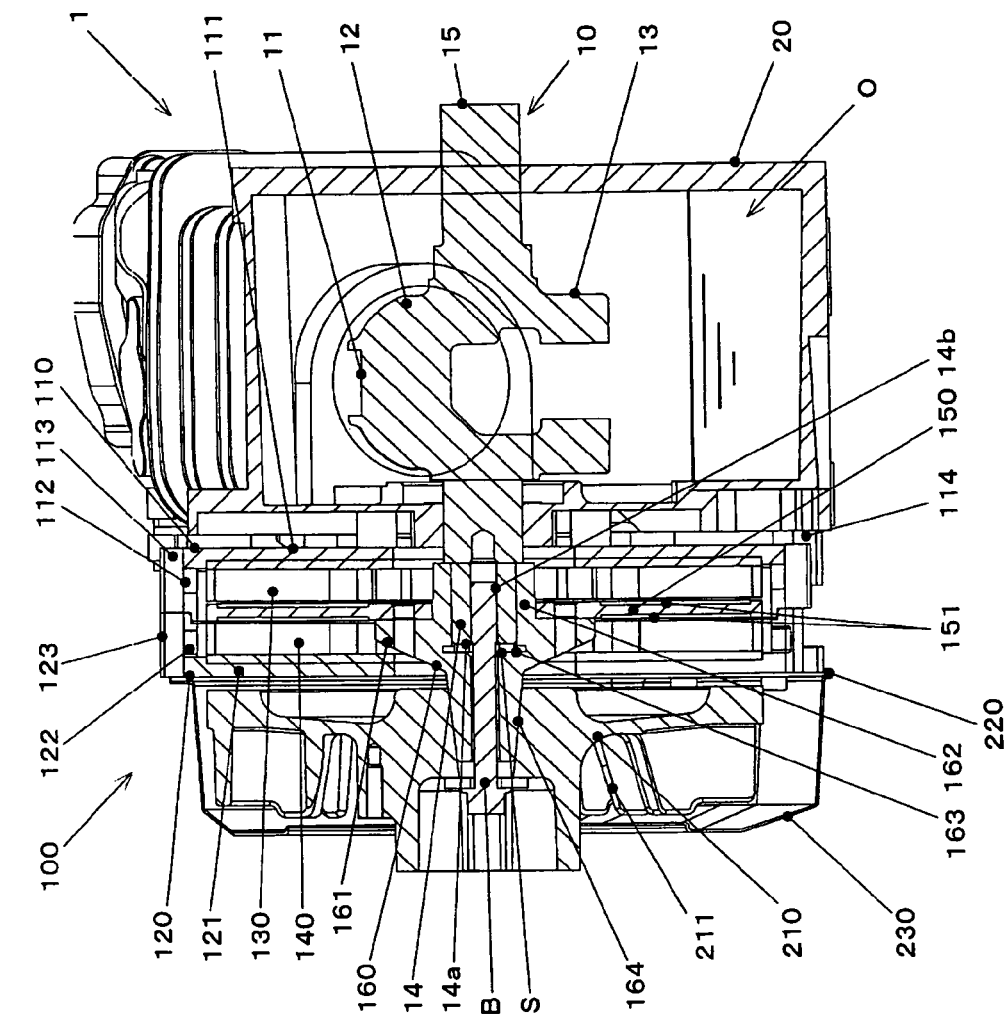
FIG. 1 is a cross-sectional diagram of an engine that is provided with an embodiment of an axial gap type generator according to the present invention.

FIG. 1 is a cross-sectional diagram of an engine provided with the axial gap type generator of the embodiment.

Figure 2:
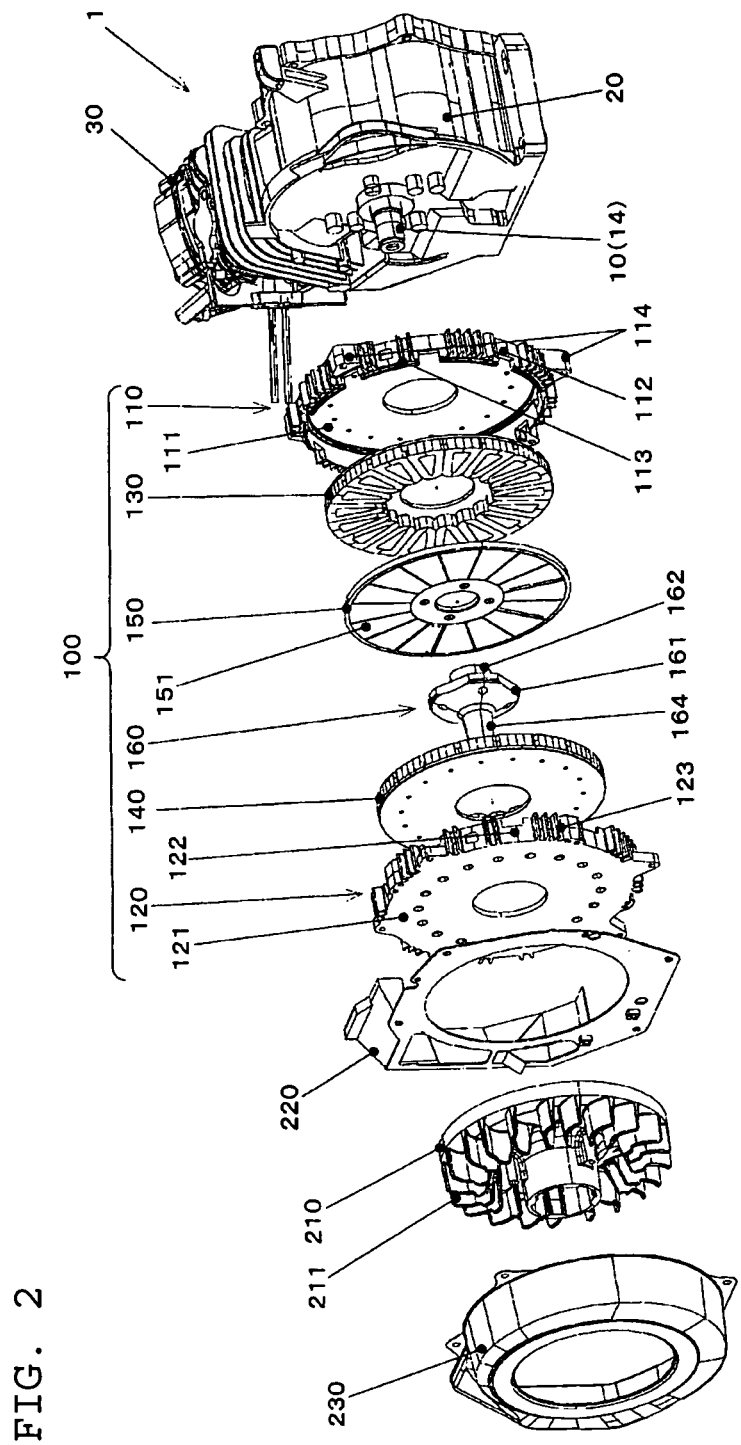
FIG. 2 is an exploded perspective-view diagram of the engine and the axial gap type generator of FIG. 1.

FIG. 2 is an exploded perspective-view diagram of the engine and the axial gap type generator of FIG. 1.

An engine 1 in the drawings is, for instance, a single-cylinder four-stroke OHC gasoline engine.

The engine 1 includes a crankshaft 10, a crank case 20 and so forth.

The crankshaft 10 is an output shaft of the engine 1 and is rotatably supported on a bearing that is provided in the crank case 20.

The crankshaft 10 has, for instance, a crank pin 11, a crank arm 12, a crank weight 13 and the like at an intermediate portion thereof, and is supported on bearings on both sides.

The crankshaft 10 has output shafts 14, 15 that protrude from both sides of the crank case 20.

The output shaft 14 drives a below-described axial gap type generator 100 that is mounted on the output shaft 14.

An end face 14a at the leading end of the output shaft 14 is formed to a planar shape that extends in a direction perpendicular to the axial direction.

A screw hole 14b, into which there are co-fastened a flywheel 210 and an adapter 160 that fixes a rotor yoke 150 of the axial gap type generator 100, is formed from the end face 14a along the axial direction.

The output shaft 15 is connected with an unillustrated driven device.

The crank case 20 is a container-like member that houses and rotatably supports the intermediate portion of the crankshaft 10.

A cylinder unit of the engine 1 is integrally formed with the crank case 20. A cylinder head 30 (FIG. 2) and the like is mounted at the cylinder unit. The cylinder head 30 has intake and exhaust ports, a valve train, a drive system thereof, spark plugs and so forth.

As illustrated in FIG. 1, oil O for lubricating the engine 1 is stored at the bottom in the crank case 20.

The axial gap type generator 100 is mounted on the engine 1.

The axial gap type generator 100 includes, for instance, a front case 110, a rear case 120, a front stator core 130, a rear stator core 140, the rotor yoke 150, and the adapter 160.

The front case 110 and the rear case 120 are configured in the form of two split cases, divided in the axial direction and serve as a housing (generator case) containing the constituent members of the axial gap type generator 100.

Figure 3:
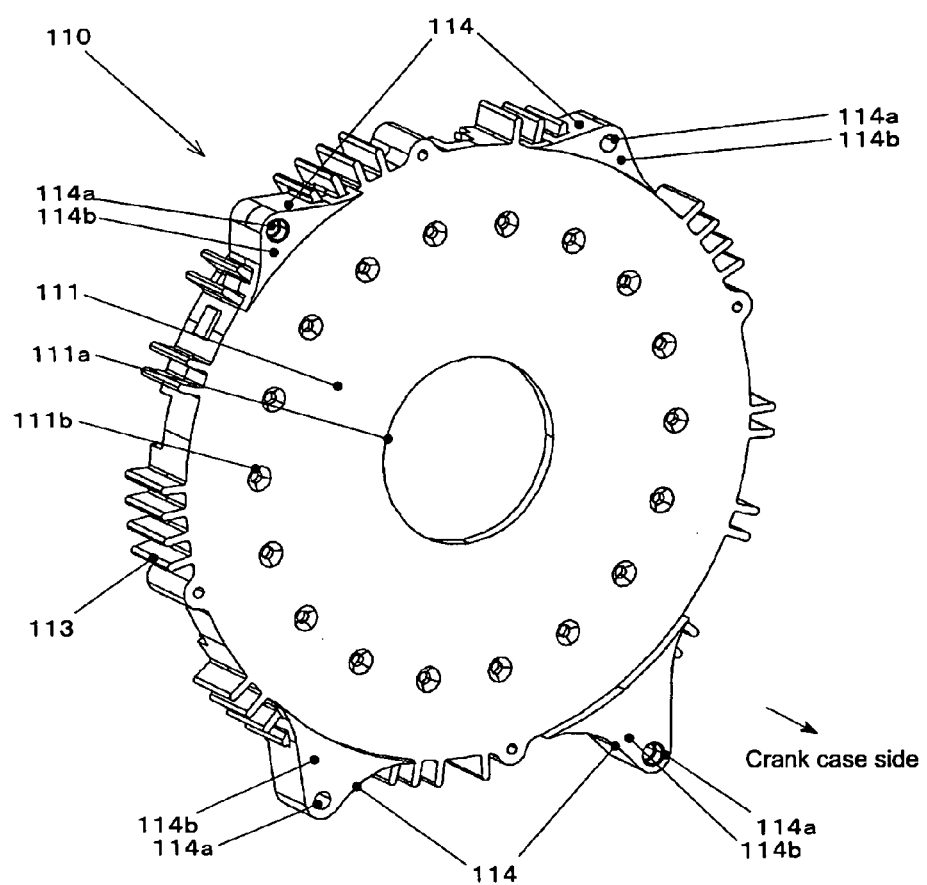
FIG. 3 is an external perspective-view diagram of a generator case of the axial gap type generator of FIG. 1.

FIG. 3 is an external perspective-view diagram of the front case viewed from the crank case.

The front case 110 is integrally formed with a disc 111, a peripheral wall 112, cooling fins 113, mounting sections 114 and the like, by, for instance, die-casting of an aluminum alloy.

The disc 111 is plate and disc shaped, and is disposed along a plane that is perpendicular to the center axis of the crankshaft 10.

An opening 111a is formed at the central section of the disc 111. The crankshaft 10 is inserted through the opening 111a.

Screw holes 111b for fastening the front stator core 130 are formed in the disc 111 such that they are distributed in the peripheral direction.

The peripheral wall 112 is a surface section that extends, from the outer peripheral edge of the disc 111, along the axial direction of the crankshaft 10, towards the side opposite to the crank case 20.

The cooling fins 113 protrude in the radial direction, from the outer peripheral face of the peripheral wall 112.

The cooling fins 113 are formed in fin shapes such that they extend along the direction of flow of cooling air that is generated by a below-described blower fan 211. The cooling fins 113 are distributed in the peripheral direction of the front case 110.

The cooling air flows through the spacings between the cooling fins 113 towards the cylinder head 30.

The mounting sections 114 make up a generator case support that constitutes a base at which the front case 110 is fixed to the crank case 20.

As an example, four mounting sections 114 are provided in FIG. 3. The four mounting sections 114 are distributed in the peripheral direction of the disc 111, and protrude from the outer peripheral edge of the disc 111 of the front case 110 towards the outer diameter side.

The mounting sections 114 are disposed at the outer diameter side with respect to the outer peripheral edges of the front stator core 130 and the rear stator core 140.

Bolt holes 114a are formed in respective mounting sections 114. Bolts for fastening the front case 110 to the crank case 20 are inserted through the bolt holes 114a.

Abutting face sections 114b at which the mounting sections 114 abut the crank case 20 protrude in the form of steps on the crank case 20 side of the disc 111.

As a result, a spacing is provided between the disc 111 and the crank case 20 upon fastening of the front case 110 to the crank case 20.

Connection sites for connecting the mounting sections 114 and the crank case 20 are disposed apart from the area at which high-temperature oil O is stored, with the crank case 20 viewed in the axial direction of the crankshaft 10.

The rear case 120 is disposed on the side opposite to the crank case 20, across the front case 110.

The rear case 120 is integrally formed with a disc 121, a peripheral wall 122, cooling fins 123 and the like, by, for instance, die-casting of an aluminum alloy.

The disc 121 is plate and disc shaped, and is disposed along a plane that is perpendicular to the center axis of the crankshaft 10.

An opening is formed at the central section of the disc 121. The adapter 160 is inserted through this opening. The opening is formed substantially in the same way as the opening 111a of the front case 110.

Screw holes for fastening the rear stator core 140 are formed in the disc 121 such that they are distributed in the peripheral direction. These screw holes are formed substantially in the same way as the screw holes 111b of the front case 110.

The peripheral wall 122 is a surface section that extends, from the outer peripheral edge of the disc 121, along the axial direction of the crankshaft 10, towards the crank case 20 (towards the front case 110).

The peripheral wall 112 of the front case 110 and the peripheral wall 122 of the rear case 120 are joined in a state where the leading end edges of the peripheral walls abut each other, and are fastened by way of bolts or the like.

In order to enhance the relative alignment precision between the front case 110 and the rear case 120, portions of the leading end of the peripheral wall 112 on the inner diameter side of the front case 110 protrudes, in the form of a step towards the rear case 120, while at the leading end of the peripheral wall 122 there are formed stepped recesses onto which these protrusions fit.

The front case 110 and the rear case 120 are positioned through a so-called "socket-and-spigot joint" such that the protrusions of the peripheral wall 112 fit onto the recesses of the peripheral wall 122.

The cooling fins 123 protrude in the radial direction from the outer peripheral face of the peripheral wall 122.

The cooling fins 123 are formed substantially in the same way as the cooling fins 113 of the front case 110 described above.

The cooling fins 113 and the cooling fins 123 are disposed at overlapping positions in the peripheral direction of the axial gap type generator 100, and are formed so as to configure a substantially continuous surface section.

Power generation coils are provided at the front stator core 130 and the rear stator core 140 The Power generation coils are configured by, for example, winding coils around an iron core.

The front stator core 130 is mounted on the surface section on the rear case 120 side of the disc 111 of the front case 110.

The rear stator core 140 is mounted on the surface section on the front case 110 side of the disc 121 of the rear case 120.

The front stator core 130 and the rear stator core 140 are formed split into a plurality of pieces in the peripheral direction, such that the pieces are fastened to a respective discs 111 and 121 by way of screws.

The front stator core 130 and the rear stator core 140 are disposed opposing each other in the axial direction of the crankshaft 10.

The rotor yoke 150 is configured through mounting of permanent magnets 151 for power generation on both sides of a disc-like member that has an opening in the central section.

The rotor yoke 150 is disposed between the front stator core 130 and the rear stator core 140, with a predetermined gap left between the stator cores.

The rotor yoke 150 is fixed to the crankshaft 10 by way of the below-described adapter 160, and rotates relatively with respect to the stator cores 130 and 140 during operation of the engine 1.

The adapter 160 is fixed to the output shaft 14 of the crankshaft 10, and the rotor yoke 150 is fixed to the adapter 160.

The adapter 160 is integrally formed with a disc 161, a tubular section 162, a shim clamper 163 and a flywheel mounting section 164.

The inner diameter-side portion of the rotor yoke 150 is fastened to the outer diameter-side portion of the disc 161. The disc 161 is plate and disc shaped.

The disc 161 is disposed inside the rear case 120, and is provided such that the position of the disc 161 in the axial direction of the crankshaft 10 is in the vicinity of the leading end of the output shaft 14.

The rotor yoke 150 is mounted on the surface section on the crank case 20 side of the disc 161.

The tubular section 162 is cylinder shaped and protrudes from the surface section on the crank case 20 side of the disc 161. The output shaft 14 of the crankshaft 10 is inserted into the tubular section 162.

The shim clamper 163 is a surface section that forms a bottom face of the tubular section 162, and is plane shaped in a direction perpendicular to the rotation axis direction of the crankshaft 10.

A disc-like shim S for adjusting the axial-direction position of the rotor yoke 150 is clamped between the shim clamper 163 and the end face 14a of the output shaft 14 of the crankshaft 10.

The thickness of the shim S is set in such a manner that the rotor yoke 150 is disposed so as to leave appropriate gaps with respect to the front stator core 130 and the rear stator core 140.

Specifically, for instance, the distance, in the axial direction of the crankshaft 10, between the end face 14a of the output shaft 14 and a site for measurement is measured, the site being set beforehand at the crank case 20 or at a member fixed thereto. A shim is selected that has a thickness corresponding to the measured distance, on the basis of prepared correlation data of distance-shim thickness.

The flywheel mounting section 164 is shaped as a tapered shaft and protrudes from the disc 161 to the side opposite to the crank case 20.

The flywheel 210 of the engine 1 is mounted on the flywheel mounting section 164.

As illustrated in FIG. 1, the flywheel 210 and the adapter 160 are co-fastened and fixed to the crankshaft 10 with a high-tension bolt B.

Connection strength can be secured easily by thus configuring the flywheel mounting section 164 in the shape of a tapered shaft.

The blower fan 211 that generates cooling air during rotation is integrally formed with the flywheel 210.

The flywheel 210 is provided with a blower housing base 220 and a blower housing 230 respectively on the crank case 20 side and on the opposite side of the crank case 20.

The blower housing base 220 and the blower housing 230 are fixed to the rear case 120 and are disposed surrounding the flywheel 210, including the blower fan 211. The blower housing base 220 and the blower housing 230 form an air flow path in which cooling air passes by the cooling fins 113 and 123 and reaches the cylinder and the cylinder head 30.

The embodiment explained above elicits the following effects.

(1) By supporting the disc 111 apart from the crank case 20 with the mounting sections 114 which protrudes from the disc 111 of the front case 100, transfer of heat between the foregoing can be suppressed, and power generation efficiency can be prevented from decreasing due to the temperature rise in the interior of the axial gap type generator 100.

Furthermore, integral formation of the mounting sections 114 with the front case 110 achieves the above-described effect without increasing the number of parts.

(2) Since the heat transfer path from the crank case 20 to the stator cores 130 and 140 is lengthen by arranging the mounting sections 114 on the outer diameter-side against the stator cores 130 and 140, heat transfer to the stator cores 130 and 140 can be suppressed.

(3) Transfer of heat from the oil O to the axial gap type generator can be suppressed by disposing the mounting sections 114 at positions other that the oil reservoir in the crank case 20.

[Variations]

The present invention is not limited to the embodiment explained above, and may accommodate various alterations and modifications, which lie within the technical scope of the present invention.

The shape, structure, material, manufacturing method, disposition and so forth of the members that constitute the engine and the axial gap type generator are not limited to those in the configuration of the above-described embodiment, and can be appropriately altered.

In the present embodiment, for instance, the mounting sections provided on the generator case side protrude towards the crank case. Alternatively, crank case-side mounting sections may be caused to protrude towards the generator case alternatively or with the mounting sections still being protruded towards the crank case.

A spacer comprising a separate part may be provided between the generator case and the crank case. In such an instance, the spacer may be made with a material having low heat conductivity with respect to the crank case and the generator case, such as a nylon resin.

What is claimed is:

1. An axial gap type generator comprising:
   a generator case fixed to a crank case of an engine via a connection member;
   a rotor yoke housed inside the generator case and fixed to a crankshaft of the engine;
   a first stator core and a second stator core fixed to an inner face of the generator case and disposed flanking the rotor yoke in a rotation axis direction; and
   a generator case support that supports the generator case in such a manner that a surface section of the generator case opposing the crank case has a spacing between the surface section and the crank case, wherein the generator case support includes at least one protrusion formed protruding from the generator case towards the crank case, wherein the generator case support is disposed at a position apart from an oil reservoir in the crank case along an axial direction of the crankshaft.

2. The axial gap type generator according to claim 1, wherein the generator case support is disposed further toward an outer diameter side than an outer peripheral edge of the stator cores.

3. The axial gap type generator according to claim 1, wherein the crankshaft includes output shafts that protrude from both sides of the crank case.

4. The axial gap type generator according to claim 1, wherein the oil reservoir is disposed at a bottom of the crank case.

5. The axial gap type generator according to claim 1, wherein the generator case includes cooling fins which protrude in a radial direction from an outer peripheral face of a peripheral wall of the generator case.

6. The axial gap type generator according to claim 1, wherein the generator case support is disposed radially outward from a peripheral wall of the generator case.

7. The axial gap type generator according to claim 1, wherein the generator case support includes an abutting face section which protrudes in a form of steps on a crank case side of the generator case support, and wherein the abutting face section abuts the crank case so as to form the spacing between the surface section and the crank case.

8. The axial gap type generator according to claim 1, furthering comprising a blower housing fixed to the generator case at a location of the generator case support and on a side opposite the crank case of the generator case.

9. The axial gap type generator according to claim 2, wherein the crankshaft includes output shafts that protrude from both sides of the crank case.

10. The axial gap type generator according to claim 2, wherein the oil reservoir is located at a bottom of the crank case.

11. The axial gap type generator according to claim 2, wherein the generator case includes cooling fins which protrude in a radial direction from an outer peripheral face of a peripheral wall of the generator case.

12. The axial gap type generator according to claim 2, wherein the generator case support is disposed radially outward from a peripheral wall of the generator case.

13. The axial gap type generator according to claim 2, wherein the generator case support includes an abutting face section which protrudes in a form of steps on a crank case side of the generator case support, and wherein the abutting face section abuts the crank case so as to form the spacing between the surface section and the crank case.

14. The axial gap type generator according to claim 2, furthering comprising a blower housing fixed to the generator case at a location of the generator case support and on a side opposite the crank case of the generator case.

* * * * *